United States Patent
Ohtani et al.

(10) Patent No.: US 6,798,487 B1
(45) Date of Patent: Sep. 28, 2004

(54) LIQUID CRYSTAL CELL SUBSTRATE INCLUDING RESIN SUBSTRATE, GAS BARRIER LAYER, CROSSLINKED RESIN LAYER AND POLARIZING LAYER

(75) Inventors: Akira Ohtani, Osaka (JP); Takashi Yamaoka, Osaka (JP); Daisuke Uenda, Osaka (JP); Hiroyuki Yoshimi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/661,057

(22) Filed: Sep. 13, 2000

(30) Foreign Application Priority Data

Sep. 27, 1999 (JP) ............................................. 11-272034

(51) Int. Cl.[7] ..................... G02F 1/1333; G02F 1/1335; C08F 283/00
(52) U.S. Cl. ......................... 349/158; 349/96; 349/122; 525/524
(58) Field of Search ................................ 349/2, 58, 96, 349/99, 122, 158, 98; 428/40.1, 215, 345, 355; 525/524

(56) References Cited

U.S. PATENT DOCUMENTS

| | | | | |
|---|---|---|---|---|
| 4,576,896 A | * | 3/1986 | Suzuki et al. | 430/270.11 |
| 5,687,465 A | * | 11/1997 | Hinata et al. | 156/286 |
| 6,208,397 B1 | * | 3/2001 | Shimodaira et al. | 349/112 |
| 6,288,840 B1 | * | 9/2001 | Perkins et al. | 359/485 |
| 6,407,183 B1 | * | 6/2002 | Shimada et al. | 525/524 |

FOREIGN PATENT DOCUMENTS

| JP | 02-058527 A | * | 2/1990 |
|---|---|---|---|
| WO | WO 97/39380 | * | 10/1997 |

OTHER PUBLICATIONS

"HDBU (High Density Build Up) Organic Package Technology that is first in the industry to employ "Laser Via" method", Kyocera Corporation, Feb. 15, 1999.*

* cited by examiner

*Primary Examiner*—Tarifur R. Chowdhury
(74) *Attorney, Agent, or Firm*—Sughrue Mion, PLLC

(57) ABSTRACT

A liquid crystal cell substrate having a polarizing function is disclosed which can be extremely thin and lightweight and is excellent in heat resistance, impact resistance and quality stability. The liquid crystal cell substrate comprises a resin substrate and, closely adhered thereon, at least a gas barrier layer, a crosslinked resin layer and a polarizing layer, wherein the polarizing layer comprises a coating layer. This cell substrate, having a polarizing function and high durability, can be efficiently produced because an exceedingly thin polarizing layer having excellent heat resistance can be deposited on a resin substrate by coating and because a gas barrier layer and a crosslinked resin layer also can be easily formed. It is excellent in moisture resistance, gas resistance and impact resistance, can be extremely thin and lightweight, and has excellent heat resistance. With this liquid crystal cell substrate, a liquid crystal cell excellent in the long-term stability of display quality can be fabricated.

6 Claims, 1 Drawing Sheet

LIQUID CRYSTAL CELL SUBSTRATE INCLUDING RESIN SUBSTRATE, GAS BARRIER LAYER, CROSSLINKED RESIN LAYER AND POLARIZING LAYER

FIELD OF THE INVENTION

The present invention relates to a resin-based liquid crystal cell substrate which has a polarizing function, is excellent in heat resistance, moisture resistance, gas barrier properties, durability, etc., can be extremely thin and lightweight, and is suitable for user in fabricating liquid crystal displays.

BACKGROUND OF THE INVENTION

Conventional liquid crystal cells having a polarizing function employ a cell substrate having bonded thereto a polarizing plate. It has been proposed to use in this cell substrate a resin substrate capable of being extremely thin and lightweight in place of glass substrates, which are heavy and fragile, so as to cope with the trend toward display size increase. However, the proposed resin substrate has had problems that it cannot be sufficiently reduced in weight and thickness because the conventional polarizing plate has a five-layer structure formed by bonding a transparent protective film to each side of a polarizer through an adhesive layer and hence has a total thickness of generally 100 $\mu$m or larger, and that the resin substrate is difficult to use at a temperature of 100° C. or higher because the polarizing plate has insufficient heat resistance.

SUMMARY OF THE INVENTION

Accordingly, an object of the present invention is to provide a liquid crystal cell substrate which has a polarizing function, can be extremely thin and lightweight, and is excellent in heat resistance, impact resistance, and quality stability.

The present invention provides a liquid crystal cell substrate comprising a resin substrate and, closely adhered thereon, a gas barrier layer, a crosslinked resin layer, and a polarizing layer, wherein the polarizing layer comprises a coating layer.

According to the present invention, a liquid crystal cell substrate having a polarizing function and high durability can be efficiently produced because an exceedingly thin polarizing layer having excellent heat resistance can be deposited on a resin substrate by coating and because a gas barrier layer and a crosslinked resin layer also can be easily formed. It is excellent in moisture resistance, gas resistance, and impact resistance, can be extremely thin and lightweight, and has excellent heat resistance. With this liquid crystal cell substrate, a liquid crystal cell excellent in the long-term stability of display quality can be fabricated.

Figure 1:
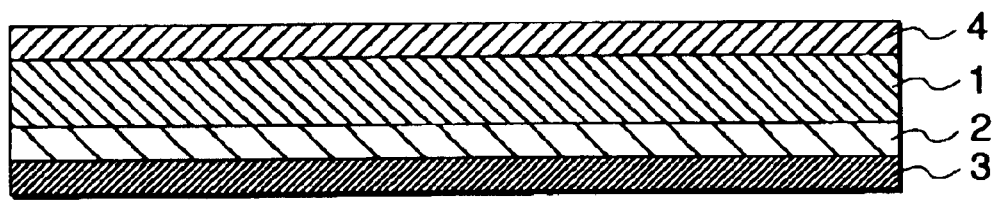
FIG. 1 is a sectional view showing one embodiment of a liquid crystal cell substrate according to the present invention.

Reference Numerals in the drawings are as follows.
1: Resin substrate
2: Gas barrier layer
3: Crosslinked resin layer
4: Polarizing layer

DETAILED DESCRIPTION OF THE INVENTION

Figure 2:
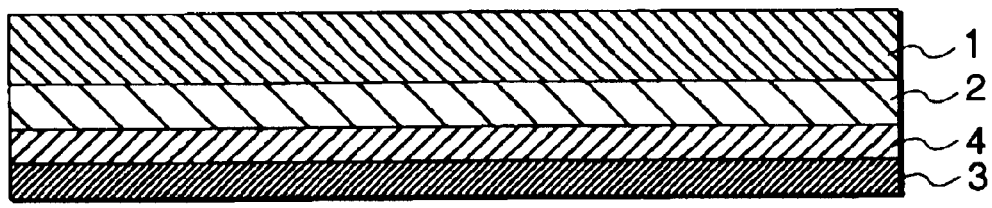
FIG. 2 is a sectional view showing another embodiment of a liquid crystal cell substrate according to the present invention.

The liquid crystal cell substrate according to the present invention comprises a resin substrate and, closely adhered thereon, at least a gas barrier layer, a crosslinked resin layer, and a polarizing layer which comprises a coating layer. Embodiments thereof are shown in FIGS. 1 and 2, wherein numeral 1 denotes a resin substrate, 2 a gas barrier layer, 3 a crosslinked resin layer, and 4 a polarizing layer.

The resin substrate serves as the base of the cell substrate to support the layers disposed thereon, e.g., the gas barrier layer. It can be formed from an appropriate resin such as a thermoplastic resin or thermosetting resin. From the standpoint of heat resistance necessary for disposing the polarizing layer, a transparent conductive film and other layers on the resin substrate, and from other standpoints, a preferred resin substrate is one made of a resin having a glass transition temperature of generally 130° C. or higher, preferably 150° C. or higher, more preferably 160° C. or higher.

The resin substrate preferably is excellent in transparency and impact resistance. Especially preferred is a resin substrate having a light transmittance of 80% or higher. From the standpoint of preventing change in quality of liquid crystals and attaining durability and other properties in a liquid crystal cell, a preferred resin substrate is one having excellent chemical resistance, optical isotropy, low water absorption, low moisture absorption and barrier property to gases including oxygen.

Examples of the resin used for forming the resin substrate include thermoplastic resins such as polycarbonates, polyarylates, polyethersulfones, polyesters, polysulfones, poly(methyl methacrylate), polyetherimides and polyamides, and thermosetting resins such as epoxy resins, unsaturatedpolyesters, poly(diallyl phthalate) and poly (isobornyl methacrylate). These resins can be used alone or as a mixture of two or more thereof.

A resin substrate which can be advantageously used from the standpoint of the performances described above is one formed from an epoxy resin. Various epoxy resins can be used as the epoxy resin without particular limitations. Examples thereof include bisphenol types such as the bisphenol A, bisphenol F and bisphenol S types, and hydrogenated forms thereof, novolak types such as the phenolic novolak and cresol novolak types, nitrogen-containing types such as the triglycidyl isocyanurate type and hydantoin type, alicyclic types, aliphatic types, aromatic types such as the naphthalene type, glycidyl ether types, low-water-absorption types such as the biphenyl type, dicyclo types, ester types, etherester types, and modifications of those.

Preferred epoxy resins from the standpoint of optical properties including transparency and other standpoints are ones which contain no conjugated double bonds, e.g., benzene ring, and have satisfactory discoloration resistance, such as alicyclic types. Furthermore, epoxy resins having an epoxy equivalent of from 100 to 1,000 and a softening point of 120° C. or lower can generally be used advantageously from the standpoint of the flexibility, strength, and other properties of the resin substrate to be obtained therefrom. One epoxy resin or a combination of two or more epoxy resins may be used. A combination of a liquid epoxy resin and a solid epoxy resin may also be used. Strength and heat resistance can be improved when a liquid epoxy resin is used in combination with a solid epoxy resin.

An especially preferred epoxy resin substrate, from the standpoints of heat resistance, etc., is one formed by thermally curing an epoxy resin with a curing agent. An example thereof is a substrate formed by thermally curing an epoxy composition comprising an alicyclic epoxy resin, an acid anhyride curing agent and aphosphorus compound curing catalyst. The curing agent is not particularly limited, and one or more curing agents suitable for the epoxy resin can be used.

Examples of the curing agent include organic acid compounds such as tetrahydrophthalic acid, methyltetrahydrophthalic acid, hexahydrophthalic acid and methylhexahydrophthalic acid, and amine compounds such as ethylenediamine, propylenediamine, diethylenetriamine, triethylenetetramine, amine adducts of these amines, m-phenylenediamine, diaminodiphenylmethane and diaminodiphenyl Other examples of the curing agent include amide compounds such as dicyandiamide and polyamides, hydrazide compounds such as dihydrazide, and imidazole compounds such as methylimidazole, 2-ethyl-4-methylimidazole, ethylimidazole, isopropylimidazole, 2,4-dimethylimidazole, phenylimidazole, undecylimidazole, heptadecylimidazole and 2-phenyl-4-methylimidazole.

Further examples of the curing agent include imidazoline compounds such as methylimidazoline, 2-ethyl-4-methylimidazoline, ethylimidazoline, isopropylimidazoline, 2,4-dimethylimidazoline, phenylimidazoline, undecylimidazoline, heptadecylimidazoline and 2-phenyl-4-methylimidazoline, phenol compounds, urea compounds, and polysulfide compounds.

Acid anhydride compounds are still further examples of the curing agent. These acid anhydride curing agents are preferred from the standpoints of attaining an improved working atmosphere based on reduced irritating properties, obtaining a cured layer having improved heat resistance, resulting in high temperature durability and discoloration resistance, etc. Examples thereof include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic annydrice, dilchlorosuccinic anhydride, benzophenonetetracarboxylic anhydride, and chlorendic anhydride.

Especially preferred of these curing agents are the acid anhydride curing agents which are colorless to pale yellow and have a molecular weight of about 140 to 200, such as phthalic anhydride, tetrahydrophthalic anhydride, hexahydrophthalic anhydride and methylhexahydrophthalic anhydride.

The amount of the curing agent used can be suitably determined according to the kind of the curing agent, the epoxy equivalent of the epoxy resin, etc., as in the ordinary curing of epoxy resins. In the case of the acid anhydride curing agents, for example, they are used in an amount of preferably 0.5 to 1.5 equivalents, more preferably 0.6 to 1.4 equivalents, most preferably 0.7 to 1.2 equivalents, per equivalent of epoxy groups from the standpoint of obtaining a cured layer satisfactory in hue, retention of moisture resistance, etc. Also, in the case of using other curing agents alone or in combination of two or more thereof, the use amount thereof in terms of equivalent proportion can be the same as in the case described above.

A curing accelerator can be used according to need in curing the epoxy resin. The curing accelerator is not particularly limited. Examples thereof include tertiary amines, imidazole compounds, quaternary ammonium salts, organo-metallic salts, phosphorus compounds and urea compounds. Such curing accelerators can be suitably used alone or in combination of two or more thereof according to the kind of the epoxy resin, the kind of the curing agent, etc. By using a curing accelerator, the rate of curing can be increased to thereby shorten the treatment time necessary for curing. The amount of the curing accelerator used can therefore be suitably determined according to the acceleration effect, etc. However, from the standpoints of discoloration resistance, etc., the amount thereof is generally 0.05 to 7 parts by weight, preferably 0.1 to 5 parts by weight, more preferably 0.2 to 3 parts by weight, per 100 parts by weight of the epoxy resin.

For the formation of the resin substrate, a suitable technique can be used, such as casting, flow casting, injection molding, roll coating, extrusion, transfer molding or reactive injection molding (RIM). In this molding, appropriate additives can be suitably incorporated according to need in an amount so as not to impair transparency. Examples of the additives include dyes, modifiers, discoloration inhibitors, antioxidants, ultraviolet absorbers, release agents, reactive diluents and non-reactive diluents.

A production process highly suitable for mass-producing an epoxy resin substrate comprises spreading an epoxy resin coating liquid which has been regulated so as to be spreadable by, for example, optionally diluting coating components with a solvent into a sheet form on a support such as an endless belt or drum by an appropriate technique, e.g., Curtain coating, roll coating, wire-wound-bar coating, extrusion coating or spray coating, and curing the spread resin.

According to the process described above, an epoxy resin substrate can be continuously produced. In this case, recovery of the epoxy resin substrate formed on the support can be accomplished by forming a readily strippable resin layer or the like on the support before the epoxy resin substrate is formed thereon. When the crosslinked resin layer or gas barrier layer to be disposed on the resin substrate is formed as a readily strippable resin layer, then a liquid crystal cell substrate according to the present invention can be efficiently formed.

In preparing the epoxy resin liquid, a two-pack type epoxy which is liquid at temperatures lower than the temperature in coating, especially at ordinary temperature, is preferably used from the standpoints of applicability, spreadability into sheet form, etc. In this case, a solid epoxy resin can be added thereto to regulate the viscosity of the coating liquid. Increasing the viscosity of the coating liquid in this manner facilitates the regulation of the thickness of the spread layer, etc.

In addition to the acid anhydride curing agents, one or more curing catalysts and one or more suitable leveling agents capable of reducing surface tension can be incorporated into the epoxy resin coating fluid according to need. Examples of the curing catalysts include phosphorus compound curing catalysts Examples of the leveling agents, which are used for the purpose of surface smoothing, include various surfactants including silicone, acrylic, and fluorochemical surfactants.

Suitable additives which may be contained in cured epoxy resins can also be incorporated according to need. Examples thereof include antioxidants, e.g., phenol compounds, amines, organosulfur compounds and phosphine compounds, modifiers, e.g., glycols, silicones and alcohols, foaming inhibitors, e.g., polyhydric alcohols such as glycerol, hydroxyl-containing compounds, dyes, discoloration inhibitors, and ultraviolet absorbers.

The thickness of the resin substrate can be suitably determined. However, from the standpoints of thickness reduction weight reduction, strength, deformation resistance, etc., the thickness thereof is preferably 1 mm or smaller, more preferably 800 μm or smaller, most preferably 100 to 500 μm. From the standpoint of display quality, etc., the resin substrate preferably has a high thickness precision, especially within ±10%. The resin substrate may be a single-layer product or a layered product comprising two or more layers of the same or different resins.

The gas barrier layer disposed on the resin substrate is intended to shut off water, oxygen and other substances, which may modify liquid crystals. This layer can be made of an appropriate material which can prevent gas permeation (see JP-A-58-208039 (the term "JP-A" as used herein means an "unexamined published Japanese patent application"), JP-A-2-169620, and JP-A-5-110639). From the standpoints of durability, deformation resistance, etc., the gas barrier film is preferably a polymer film. Preferred examples of the polymer include ones having a low coefficient of oxygen permeability, such as poly (vinyl alcohol), partially saponified poly (vinyl alcohol)s, ethylene/vinyl alcohol copolymers, polyacrylonitrile and poly(vinylidene chloride). Especially preferred are vinyl alcohol polymers from the standpoints of gas barrier properties, evenness of water diffusion or absorption, etc.

The gas barrier layer can be formed by, for example, spreading a polymer solution by a suitable coating technique such as casting or spin coating. The thickness of the gas barrier layer is preferably 15 μm or smaller, more preferably 1 to 10 μm from the standpoints of transparency, coloring prevention, barrier properties with respect to gases including oxygen and water vapor, etc.

The crosslinked resin layer disposed on the resin substrate is intended to form a hard surface and thereby prevent the generation of mars, which inhibit visibility. Consequently, this layer can be formed from an appropriate crosslinkable resin capable of forming a transparent hard film. Especially preferably used is an ultraviolet-curable resin of, e.g., the urethane-acrylic or epoxy type comprising a polyfunctional monomer which is three-dimensionally crosslinkable by ultraviolet irradiation with the aid of a photocatalyst.

The crosslinked resin layer can be formed by, for example, spreading a resin liquid on a given surface by a suitable coating technique such as casting, spin coating or dipping, and then crosslinking the resin. The thickness of the crosslinked resin layer can be suitably determined, and is generally 200 μm or smaller, preferably 100 μm or smaller, more preferably 1 to 50 μm. In general, the crosslinked resin layer in the cell substrate is disposed as a surface layer on, e.g., the gas barrier layer from the standpoint of the purposes of the formation thereof, as shown in the drawings.

Each of the gas barrier layer and the crosslinked resin layer may be disposed on each side of the resin substrate. However, from the standpoint of the functions and purposes thereof, the gas barrier layer and the crosslinked resin layer are generally disposed on one side of the resin substrate, especially on the side which will constitute the external surface of the liquid crystal cell to which the cell substrate is to be applied. On the other hand, the polarizing layer also can be disposed on each side of the resin substrate. However, from the standpoint of the function and purpose thereof, the polarizing layer is generally disposed on one side of the resin substrate. In this case, the polarizing layer 4 may be disposed either on the side of the resin substrate 1 where the gas barrier layer 2 is present or on the side thereof where the layer 2 is absent, as shown in the drawings. The polarizing layer may be disposed so as to be in contact with the resin substrate. Alternatively, it maybe interposed between layers disposed on the resin substrate, e.g., between the gas barrier layer 2 and the crosslinked resin layer 3 as shown in FIG. 2.

The polarizing layer is intended to impart a polarizing function to the liquid crystal cell substrate. In the present invention, the polarizing layer is a coating layer formed by an appropriate coating technique such as casting or spin coating so that the polarizing layer has a thickness as small as possible. From the standpoint of thickness reduction in the cell substrate and in view of polarizing properties, durability, etc., the thickness of the polarizing layer is preferably 10 μm or smaller, more preferably 0.1 to 5 μm, most preferably 0.2 to 3 μm.

Consequently, an appropriate material capable of forming a film through coating can be used without particular limitations for forming the polarizing layer. From the standpoint of obtaining a polarizing layer excellent in heat resistance, etc., especially preferred examples thereof include a dichroic dye having lyotropic liquid crystallinity, a liquid crystal polymer containing a dichroic dye, and a lyotropic substance containing a dichroic dye (e.g., LC Polarizer, manufactured by Optiva Co.) (see WO 97/39380).

Examples of the dichroic dye having lyotropic liquid crystallinity include water-soluble organic dyes represented by the formula (chromogen) $(SO_3M)_n$. The chromogen, which is an azo, polycyclic, or another compound, imparts liquid crystallinity, while the sulfonic acid or salt thereof imparts water solubility. Thus, this dichroic dye as a whole shows lyotropic liquid crystallinity (see JP-W-8-511109). (The term "JP-W" as used herein means an "unexamined published PCT application".)

Specific examples of the dichroic dye include compounds represented by the following formulae (1) to (7).

(1)

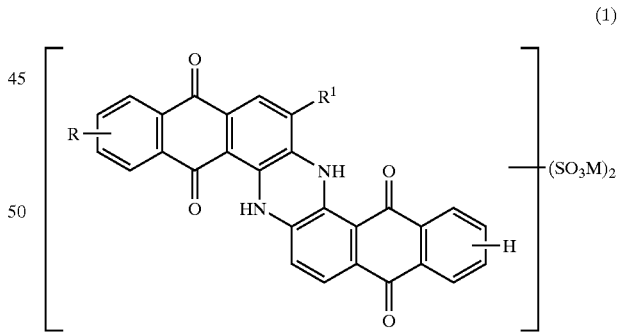

In the above formula (1), $R^1$ represents a hydrogen atom or a chlorine atom, and R represents a hydrogen atom, an alkyl group, ArNH or ArCONH. The alkyl group is preferably one having 1 to 4 carbon atoms, more preferably methyl or ethyl. The aryl group (Ar) is preferably a substituted or unsubstituted phenyl group, more preferably 4-chlorophenyl. Furthermore, M represents a cation, and is preferably a hydrogen ion, the ion of a Group I metal such as lithium, sodium, potassium or cesium, an ammonium ion, or the like (the same applies hereinafter).

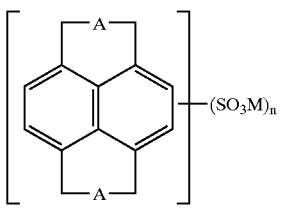
(2)

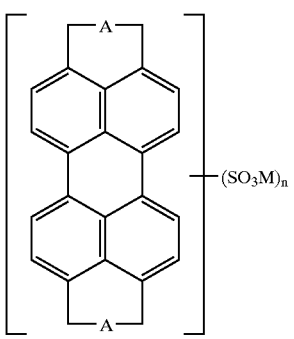
(3)

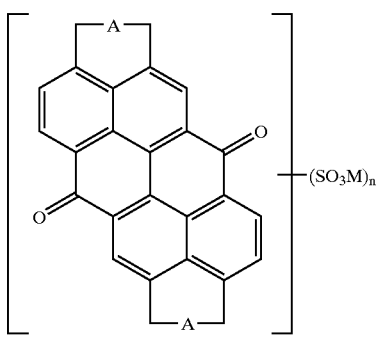
(4)

In the above formulae (2) to (4), ⌐A¬ is a group represented by formula (a) or (b):

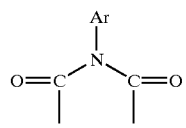
a)

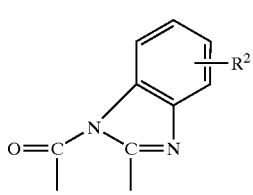
b)

wherein $R^2$ represents a hydrogen atom, an alkyl group, a halogen atom, or an alkoxy group, Ar represents a substituted or unsubstituted aryl group, and n is 2 or 3. The alkyl group is preferably one having 1 to 4 carbon atoms, more preferably methyl or ethyl. The halogen is preferably bromine or chlorine. The alkoxy group is preferably one having 1 or 2 carbon atoms, more preferably methoxy. The aryl group is preferably a substituted or unsubstituted phenyl group, more preferably unsubstituted phenyl or a phenyl group substituted in the 4-position with methoxy, ethoxy, chlorine, or butyl or in the 3-position with methyl.

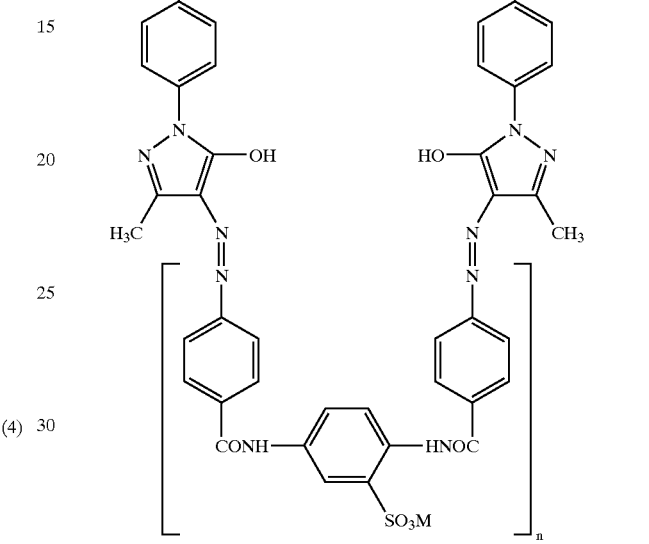
(5)

In the above formula (5), n is preferably 3 to 5.

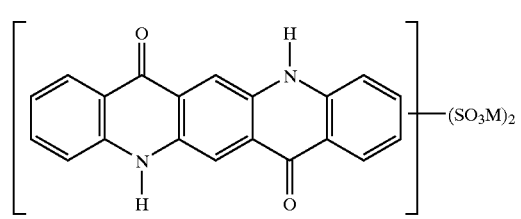
(6)

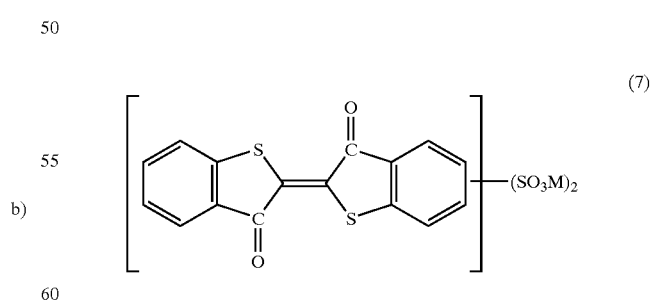
(7)

The organic dyes represented by the formula (chromogen) $(SO_3M)_n$ in the above formulae (1) to (7) show a stable liquid crystal phase due to the chromogen and dissolve in water and water-soluble organic solvents such as acetone, alcohols and dioxane. When a solution prepared by dissolving one or more of these dyes in a concentration of, e.g., 1 to 20% by weight is applied by a suitable coating technique which exerts a shearing force, e.g., doctor blade coating, an orientation treatment is accomplished. The resulting solidified layer which has been oriented shows a dichroic polarizing function.

On the other hand, the liquid crystal polymer containing a dichroic dye and showing a polarizing function can be an appropriate liquid crystal polymer showing uniaxial orientation property. Examples thereof include polymers represented by the following formula (8) (see JP-A-11-101964):

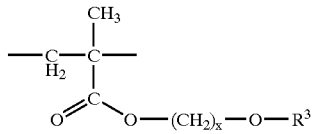

wherein x is 2 to 8 and $R^3$ represents

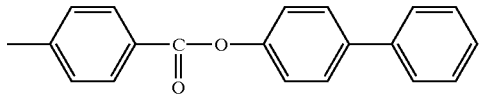

or

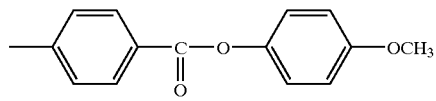

The liquid crystal polymer may be one obtained by polymerizing one or more of the liquid crystal monomers represented by the following formulae (i) to (iv) with ultraviolet irradiation (see JP-A-11-101964).

(i):

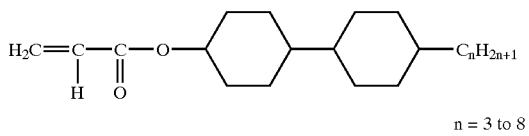

n = 3 to 8

(ii):

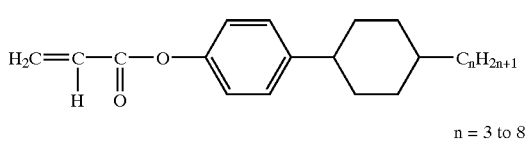

n = 3 to 8

(iii):

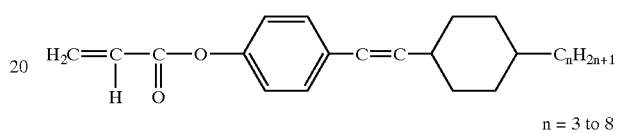

n = 3 to 8

(iv):

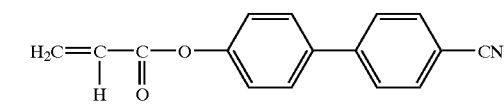

On the other hand, the dichroic dye to be incorporated in the liquid crystal polymer layer is not particularly limited and may be a suitable dichroic dye. From the standpoint of obtaining a polarizing layer excellent in heat resistance and other properties, preferred examples of the dichroic dye include dyes represented by the following formulae (9) to (11) (see JP-A-11-101964).

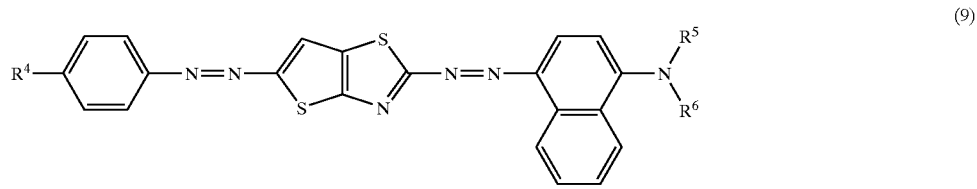

(9)

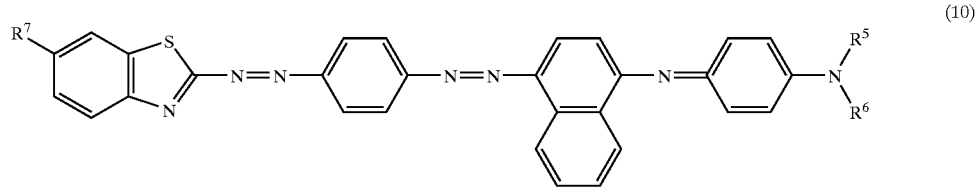

(10)

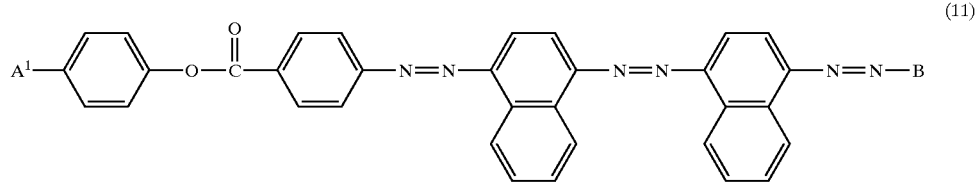

(11)

In the above formulae (9) and (10), $R^4$ represents a hydrogen atom, a halogen atom, $C_nH_{2n+1}$, $COC_nH_{2n+1}$, $OCOC_nH_{2n+1}$, $COOC_nH_{2n+1}$, or $CH_2COOC_nH_{2n+1}$. $R^5$ and $R^6$ each represents provided that $R^6$ may be a group represented by the following formula (v) or (vi), and that $R^5$ and $R^6$ in combination may form the group represented by the following formula (vii). On the other hand, $R^7$ represents a hydrogen atom, a halogen atom or $C_nH_{2n+1}$. furthermore, n is 1 to 8 and m is 1 to 5.

(v):

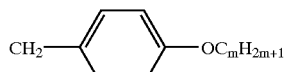

(vi):

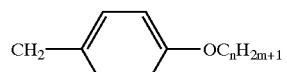

(vii):

In the above formula (11), $A^1$ is $C_nH_{2n+1}$ or a group represented by the following formula:

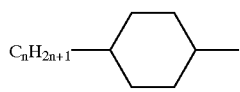

wherein n is 1 to 8.

In the above formula (11), B is a group represented by any of the following formulae (viii) to (xi) and $R^8$ is $C_nH_{2n+1}$ or $C_nH_{2n}OCH_3$, wherein n is 1 to 8.

(viii):

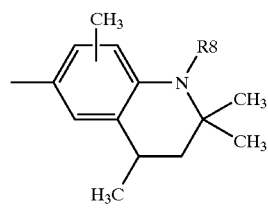

(ix):

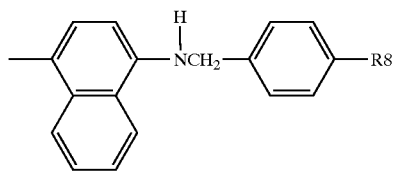

(x):

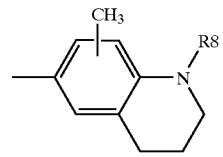

(xi):

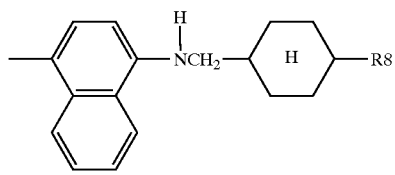

The polarizing layer can be formed by, for example, incorporating a dichroic dye into a solution containing one or more liquid crystal polymers and applying the resulting composition to, e.g., an alignment film to uniaxially orient the liquid crystal polymer(s). The liquid crystal polymer solution is usually regulated so as to have a solid concentration of about 1 to 20% by weight with a solvent. However, in the case of polymerizing a liquid crystal monomer with ultraviolet, the use of a solvent can be avoided. Dichroic dyes can be used alone or in combination of two or more thereof according to the polarization wavelength range, etc., and the use amount thereof is generally 1 to 20% by weight based on the liquid crystal polymer or liquid crystal monomer.

Examples of the liquid crystal polymer containing a dichroic dye and showing a polarizing function further include polymers represented by the following formula (12) (Nitto Giho, Vol.35, No.1(1997), pp.79–82).

(12)

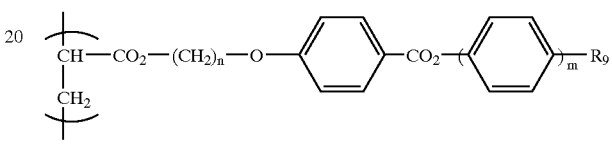

In the above formula (12), n is 1 to 10, $R_9$ represents cyano or an alkoxy group such methoxy, and m is 1 to 5.

The liquid crystal cell substrate according to the present invention can be advantageously used to form a liquid crystal cell for use in fabricating a liquid crystal display. In this case, the liquid crystal cell substrate of the present invention can be used on one or each side of a liquid crystal cell. When a substrate such as that show in FIG. 1 is used, a liquid crystal cell having a liquid crystal layer inside can be formed. When a substrate such as that shown in FIG. 2 is used, a liquid crystal cell having a liquid crystal layer outside can be formed.

For practical use of the liquid crystal cell substrate, various functional layers may be superposed thereon, such as a transparent conductive film and a retardation plate. For forming a transparent conductive film, a suitable transparent conductive material may be used, such as indium oxide, tin oxide, indium-tin mixed oxide, gold, platinum, palladium, or a transparent conductive coating composition. The transparent conductive film can be formed from such a material by a conventional suitable method, e.g., a vapor deposition technique, such as vacuum deposition or sputtering, or application of the coating composition.

The transparent conductive film can be formed also on the polarizing layer. In this case, the polarizing layer can be patterned through etching. Furthermore, a transparent layer comprising, e.g., a silica-based glass layer or a layer of a product of the hydrolytic polycondensation of a metal alkoxide may be interposed for the purposes of protecting the polarizing layer, improving the adhesion of the transparent conductive film, etc.

A liquid crystal cell can be formed by, for example, preparing two liquid crystal cell substrates each having a transparent conductive film which has been patterned so as to function as an electrode, disposing the substrates face-to-face, filling the space therebetween with a liquid crystal, and sealing the resulting structure. An orinented film, which is optionally formed for liquid crystal alignment, can be disposed on, e.g., the transparent conductive film by a suitable conventional technique. The liquid crystal cell to be formed may employ any desired liquid crystal, e.g., of TN type, STN type, TFT type or ferroelectric type.

The present invention will be described in more detail by reference to the following Examples, but it should be understood that the invention is not construed as being limited thereto.

EXAMPLE 1

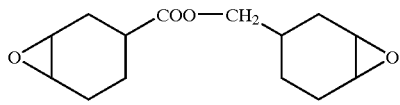

A mixture of 100 parts (parts by weight; hereinafter the same of the epoxy resin represented by the formula shown above, 125 parts of methylhexahydrophthalic anhydride, and 1 part of tri-n-butyloctylphosphonium bromide was poured into a mold and cured at 120° C. for 2 hours to obtain a resin substrate having a thickness of 400 μm.

A 5 wt % aqueous solution of poly(vinyl alcohol) was applied on one side of the resin substrate by spin coating, and the coating film was dried to form a gas barrier layer having a thickness of 5 μm. The urethane-acrylic resin represented by the following formula was applied on the gas barrier layer and crosslinked by ultraviolet irradiation to form a crosslinked resin layer having a thickness of 5 μm.

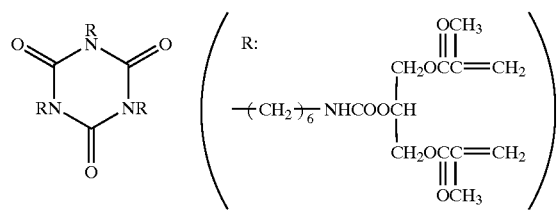

The resin substrate obtained above was coated on the other side with an aqueous solution of a lyotropic liquid crystal containing a dichroic dye (the solution was LC Polarizer, manufactured by Optiva Co.; solid concentration: 8.7% by weight) with a wire-wound bar (No. 7). The solution applied was dried at 130° C. to form a polarizing layer having a thickness of 1.3 μm. Thus, a liquid crystal cell substrate was obtained.

This liquid crystal cell substrate had a total thickness of 411 μm, a light transmittance of 40% in the wavelength range of from 400 to 700 nm and a degree of polarization in that wavelength range of 90%, and had excellent impact resistance. This substrate was subjected to a durability test at 120° C. for 500 hours. As a result, the substrate suffered neither any changes in optical properties nor deformation, etc.

EXAMPLE 2

A 5 μm thick gas barrier layer made of poly(vinyl alcohol) was formed on one side of a resin substrate in the same manner as in Example 1. The surface of the gas barrier layer was rubbed with a rayon cloth. A liquid crystal polymer solution containing a dichroic dye was applied on the rubbed surface by spin coating, and the coating film was dried at 120° C. to orient the polymer and form a polarizing layer having a thickness of 1.5 μm. A crosslinked resin layer having a thickness of 5 μm was formed from a urethane-acrylic resin in the same manner as in Example 1. Thus, a liquid crystal cell substrate was obtained.

The liquid crystal polymer solution was obtained by homogeneously mixing 26 parts of the side-chain type liquid crystal polymer represented by the following formula, 0.37 parts of dye G-202 (manufactured by Nippon Kanko Shikiso Co., Ltd.; hereinafter the same), 0.73 parts of dye G-207 and 1.46 parts of dye G-472 with 100 parts of tetrachloroethane.

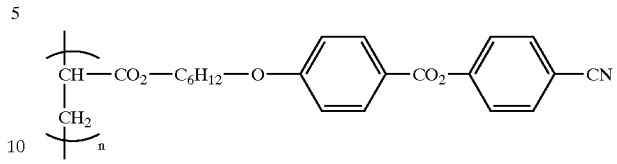

This liquid crystal cell substrate had a total thickness of 412 μm, a light transmittance of 36% in the wavelength range of from 400 to 700 nm and a degree of polarization in that wavelength range of 87%, and had excellent impact resistance. 500 hours. As a result, the substrate suffered neither any changes in optical properties nor deformation, etc.

COMPARATIVE EXAMPLE

A liquid crystal cell substrate was obtained in the same manner as in Example 1, except that a polarizer having a thickness of 215 μm (NPF-G1225DUN, manufactured by Nitto Denko Corp.) was superposed, in place of the polarizing layer, on the crosslinked resin layer through an acrylic pressure-sensitive adhesive layer.

This liquid crystal cell substrate had a total thickness of 610 μm, a light transmittance of 38% in the wavelength range of from 400 to 700 nm and a degree of polarization in that wavelength range of 99%. This substrate was subjected to a durability tests at 120° C. for 500 hours. As a result, the polarizer peeled off the substrate, showing that the substrate was unsuitable for practical use.

What is claimed is:

1. A liquid crystal cell substrate comprising an epoxy resin substrate obtained by flow casting and having been formed from a liquid alicyclic epoxy resin not containing an aromatic group and a solid alicyclic epoxy resin not containing an aromatic group, and, closely adhered on the resin substrate, a gas barrier layer, a crosslinked resin layer and a polarizing layer, said polarizing layer comprising a coating layer, wherein the polarizing layer has a thickness of 5 μm or smaller.

2. The liquid crystal cell substrate as claimed in claim 1, wherein the resin substrate comprises a thermosetting epoxy resin.

3. The liquid crystal cell substrate as claimed in claim 2, wherein the polarizing layer comprises a dichroic dye having lyotropic liquid crystallinity, a liquid crystal polymer layer containing a dichroic dye, or a lyotropic substance containing a dichroic dye.

4. The liquid crystal cell substrate as claimed in claim 2, wherein the polarizing layer is in contact with one side of the resin substrate or is located between the gas barrier layer and the crosslinked resin layer.

5. The liquid crystal cell substrate as claimed in claim 1, wherein the polarizing layer comprises a dichroic dye having lyotropic liquid crystallinity, a liquid crystal polymer layer containing a dichroic dye, or a lyotropic substance containing a dichroic dye.

6. The liquid crystal cell substrate as claimed in claim 1, wherein the polarizing layer is in contact with one side of the resin substrate or is located between the gas barrier layer and the crosslinked resin layer.

* * * * *